(12) United States Patent
Tang et al.

(10) Patent No.: US 9,942,011 B2
(45) Date of Patent: Apr. 10, 2018

(54) WIRELESS COMMUNICATION APPARATUS AND THE METHOD THEREOF

(71) Applicant: Industrial Technology Research Institute, Hsinchu (TW)

(72) Inventors: Ming-Fu Tang, Hsinchu (TW); Bor-Ching Su, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 15/592,205

(22) Filed: May 11, 2017

(65) Prior Publication Data

US 2017/0331599 A1 Nov. 16, 2017

Related U.S. Application Data

(60) Provisional application No. 62/335,696, filed on May 13, 2016.

(30) Foreign Application Priority Data

Dec. 8, 2016 (TW) .............................. 105140637 A

(51) Int. Cl.
*H04K 1/02* (2006.01)
*H04L 25/03* (2006.01)
(Continued)

(52) U.S. Cl.
CPC ........... *H04L 5/001* (2013.01); *H04B 1/0475* (2013.01); *H04L 27/2628* (2013.01)

(58) Field of Classification Search
CPC ................. H03F 1/3247; H03F 1/3294; H03F 2201/3233; H04L 27/368; H04L 25/03343; H04B 1/0475
(Continued)

(56) References Cited

U.S. PATENT DOCUMENTS 6,657,950 B1* 12/2003 Jones, IV .......... H04L 25/03038
370/208
7,184,485 B2* 2/2007 Balakrishnan ......... H04B 1/719
370/208
(Continued)

FOREIGN PATENT DOCUMENTS

EP 1811732 7/2007
EP 2835926 2/2015
(Continued)

OTHER PUBLICATIONS

Javad Abdoli, et al., "Filtered OFDM: A New Waveform for Future Wireless Systems," 2015 IEEE 16th International Workshop on Signal Processing Advances in Wireless Communications (SPAWC), Jun. 28-Jul. 1, 2015, pp. 66-70.
(Continued)

*Primary Examiner* — James M Perez
(74) *Attorney, Agent, or Firm* — JCIPRNET

(57) ABSTRACT

In one exemplary embodiment, a wireless communication apparatus transmitting data by using several sub-carriers. The wireless communication apparatus comprises a signal modulator, a signal processor, a storage, a computing processor, and a transmitter. The signal modulator generates a modulated signal in time domain based on the data. The signal processor performs signal processing on the modulated signal, and comprises a window module and a filter module. The window module performs windowing operation on the modulated signal to generate a window-operated signal. The filter module performs filtering operation on the window-operated signal to generate a transmitting signal in time domain. The computing processor performs operations of setting up the window module and the filter module according to a window characteristic function and a filter
(Continued)

characteristic function. The transmitter transmits the transmitting signal.

16 Claims, 10 Drawing Sheets

(51) Int. Cl.
*H04L 25/49* (2006.01)
*H04L 5/00* (2006.01)
*H04B 1/04* (2006.01)
*H04L 27/26* (2006.01)

(58) Field of Classification Search
USPC .................................................. 375/295–315
See application file for complete search history.

(56) References Cited

U.S. PATENT DOCUMENTS

| | | | | |
|---|---|---|---|---|
| 7,310,393 | B2* | 12/2007 | Sheu | H04H 40/27 375/348 |
| 7,499,496 | B2* | 3/2009 | Fujii | H04L 27/2621 370/208 |
| 7,602,696 | B2* | 10/2009 | Rhodes | H04L 27/2607 370/208 |
| 7,688,797 | B2* | 3/2010 | Bolinth | H04L 5/023 370/344 |
| 7,720,163 | B2* | 5/2010 | Kirsch | H04B 1/719 375/259 |
| 7,720,175 | B2* | 5/2010 | Yeon | H04L 27/2624 375/296 |
| 7,747,224 | B2* | 6/2010 | McCallister | H03F 1/0205 375/267 |
| 8,121,216 | B2* | 2/2012 | Yoshida | H04B 1/76 370/335 |
| 8,259,846 | B2* | 9/2012 | Liang | H04L 27/2614 375/285 |
| 8,290,447 | B2* | 10/2012 | Sutton | H04B 1/0475 455/165.1 |
| 8,355,466 | B2* | 1/2013 | Kleider | H04L 27/3863 375/295 |
| 8,406,323 | B2* | 3/2013 | Huang | H04L 27/265 375/260 |
| 8,472,555 | B2* | 6/2013 | Balakrishnan | H04B 1/719 375/296 |
| 8,571,136 | B1* | 10/2013 | Mahmoud | H04K 3/228 375/285 |
| 8,619,884 | B2* | 12/2013 | Gaal | H04L 25/0212 375/229 |
| 8,649,471 | B1* | 2/2014 | Charbonneau | H04L 27/2624 341/132 |
| 8,654,872 | B2* | 2/2014 | van de Beek | H04L 27/2649 375/260 |
| 8,711,974 | B2* | 4/2014 | Kumar | H03F 1/3294 375/232 |
| 8,744,009 | B2* | 6/2014 | Kleider | H04L 25/03057 375/220 |
| 8,792,572 | B1* | 7/2014 | McGowan | H04L 27/2623 375/260 |
| 8,798,558 | B2* | 8/2014 | Zhang | H04L 27/2634 370/204 |
| 8,817,900 | B2* | 8/2014 | McGowan | H04L 27/2614 330/149 |
| 8,837,652 | B2* | 9/2014 | Stern | H04L 5/0039 375/133 |
| 8,908,796 | B1* | 12/2014 | Guvenkaya | H04L 27/2626 375/296 |
| 9,287,979 | B2* | 3/2016 | Dave | H04B 10/25137 |
| 9,544,171 | B2* | 1/2017 | Berardinelli | H04L 25/03343 |
| 9,668,223 | B2* | 5/2017 | Abdelmonem | H04W 52/241 |
| 9,755,860 | B2* | 9/2017 | Kao | H04L 25/0228 |
| 2003/0123383 | A1* | 7/2003 | Korobkov | H04L 5/0037 370/208 |
| 2004/0218689 | A1* | 11/2004 | Akhtman | H04L 27/2624 375/296 |
| 2004/0252781 | A1* | 12/2004 | Park | H04L 5/0062 375/295 |
| 2006/0077885 | A1 | 4/2006 | Schnell et al. | |
| 2007/0147524 | A1* | 6/2007 | Kirsch | H04B 1/719 375/260 |
| 2008/0037668 | A1* | 2/2008 | Popoli | H04L 27/2602 375/260 |
| 2008/0205540 | A1* | 8/2008 | Takeda | H04B 7/04 375/267 |
| 2008/0219211 | A1* | 9/2008 | Franceschini | H04L 1/0041 370/330 |
| 2009/0285194 | A1* | 11/2009 | Kim | H03F 1/3247 370/342 |
| 2010/0054115 | A1* | 3/2010 | Roh | H04L 27/2634 370/208 |
| 2010/0118806 | A1* | 5/2010 | Griot | H04L 27/2607 370/329 |
| 2010/0265999 | A1* | 10/2010 | Stern | H04L 27/2613 375/219 |
| 2011/0019528 | A1* | 1/2011 | Van De Beek | H04B 1/0475 370/206 |
| 2011/0058626 | A1* | 3/2011 | Balakrishnan | H04B 1/719 375/296 |
| 2012/0269286 | A1* | 10/2012 | Huang | H04L 5/0007 375/295 |
| 2013/0005282 | A1* | 1/2013 | Zhang | H04L 27/2634 455/114.2 |
| 2013/0065623 | A1* | 3/2013 | Gummadi | H04B 1/0475 455/501 |
| 2014/0064405 | A1* | 3/2014 | Shi | H04L 25/03828 375/297 |
| 2014/0272913 | A1* | 9/2014 | Chen | G09B 7/00 434/362 |
| 2014/0293987 | A1* | 10/2014 | Zhu | H04L 5/0021 370/343 |
| 2015/0085818 | A1* | 3/2015 | Huang | H04L 5/0037 370/330 |
| 2015/0256308 | A1 | 9/2015 | Ma et al. | |
| 2015/0304146 | A1* | 10/2015 | Yang | H04L 5/0066 370/329 |
| 2015/0319768 | A1* | 11/2015 | Abdelmonem | H04L 5/006 455/452.1 |
| 2015/0333944 | A1* | 11/2015 | Bae | H04L 25/03821 375/296 |
| 2015/0372843 | A1* | 12/2015 | Bala | H04L 25/03834 375/295 |
| 2016/0198446 | A1* | 7/2016 | Wild | H04L 5/0037 370/330 |
| 2016/0204822 | A1* | 7/2016 | Yu | H04B 1/40 375/219 |
| 2016/0211999 | A1* | 7/2016 | Wild | H04L 27/264 |
| 2016/0373172 | A1* | 12/2016 | Mendes | H04L 1/0057 |
| 2016/0380689 | A1* | 12/2016 | Sun | H04L 1/206 370/330 |
| 2017/0070996 | A1* | 3/2017 | Huang | H04L 27/2608 |
| 2017/0134201 | A1* | 5/2017 | Kim | H04L 27/264 |
| 2017/0134203 | A1* | 5/2017 | Zhu | H04L 27/2614 |
| 2017/0195156 | A1* | 7/2017 | Hasegawa | H04L 27/2636 |
| 2017/0215170 | A1* | 7/2017 | Islam | H04L 27/2601 |
| 2017/0222835 | A1* | 8/2017 | Kao | H04L 25/0228 |
| 2017/0331599 | A1* | 11/2017 | Tang | H04L 5/001 |

FOREIGN PATENT DOCUMENTS

| | | |
|---|---|---|
| EP | 2843892 | 3/2015 |
| WO | 2009117874 | 10/2009 |
| WO | 2014085710 | 6/2014 |
| WO | 2014123926 | 8/2014 |

OTHER PUBLICATIONS

Thorsten Wild, et al., "5G Air Interface Design based on Universal Filtered (UF-)OFDM," Proceedings of the 19th International Con-

(56) References Cited

OTHER PUBLICATIONS ference on Digital Signal Processing (DSP), Aug. 20-23, 2014, pp. 699-704.

Vida Vakilian, et al., "Universal-Filtered Multi-Carrier Technique for Wireless Systems Beyond LTE," Globecom 2013 Workshop—Broadband Wireless Access, Dec. 9-13, 2013, pp. 223-228.

Jian (Andrew) Zhang, et al., "Sidelobe Suppression with Orthogonal Projection for Multicarrier Systems," IEEE Transactions on Communications, vol. 60, No. 2, Feb. 2012, pp. 589-599.

Yuan-Pei Lin, et al., "A Filterbank Approach to Window Designs for Multicarrier Systems," IEEE Circuits and Systems Magazine, vol. 7, Issue 1, Mar. 12, 2007, pp. 19-30.

Yuan-Pei Lin, et al., "Window Designs for DFT-Based Multicarrier Systems," IEEE Transactions on Signal Processing, vol. 53, No. 3, Mar. 2005, pp. 1015-1024.

Anders Vahlin, et al., "Optimal Finite Duration Pulses for OFDM," 1994 IEEE Globecom, Communications: The Global Bridge Conference, Nov. 28-Dec. 2, 1994, pp. 258-262.

Jeffrey G. Andrews, et al., "What Will 5G Be?" IEEE Journal on Selected Areas in Communications, vol. 32, No. 6, Jun. 2014, pp. 1065-1082.

Behrouz Farhang-Boroujeny, "OFDM Versus Filter Bank Multicarrier," IEEE Signal Processing Magazine, vol. 28, Issue 3, May 2011, pp. 92-112.

"Office Action of Taiwan Counterpart Application," dated Aug. 15, 2017, p.1-p.7, in which the listed references were cited.

* cited by examiner

WIRELESS COMMUNICATION APPARATUS AND THE METHOD THEREOF

CROSS-REFERENCE TO RELATED APPLICATIONS

The present application is based on, and claims priority from, U.S. provisional application Ser. No. 62/335,696 filed on May 13, 2016 and Taiwan Application Serial Number 105140637, filed on Dec. 8, 2016. The disclosure of which is hereby incorporated by reference herein in its entity.

TECHNICAL FIELD

The disclosure is directed to a wireless communication apparatus and the method thereof.

BACKGROUND

Orthogonal Frequency Division Multiplexing (OFDM), a modulation technology used in 4G communication systems, transmits data via multiple sub-carriers so that the OFDM is able to resist channel frequency-selective fading. In addition, the OFDM is more efficient in computation because of using Fast Fourier Transform and Inverse Fast Fourier Transform (FFT and IFFT).

The OFDM systems have characteristic of slow spectral sidelobe decay, which causes an inter-carrier interference (ICI) existing between neighboring frequency bands. In an Orthogonal Frequency Division Multiple Access (OFDMA) system, a base station will allocate different resource blocks (RBs) to serve users, and each RB comprises several neighboring sub-carriers. When the base station and those users using different RBs transmit data at the same time, the signal quality at the receiving end would be worse once there is a situation of frequency misalignment at that time. This is because that the significant ICI caused by the sidelobe of each sub-carrier could influence the signal quality received at the receiving end.

With the rapid growth of 5G communication system, the wireless communication service providers owning the granted 4G license may urge for solutions to support technical requirements of both 4G and 5G in a single system, that is simultaneously accommodating users of 4G and 5G system. However, there is a big gap between 5G and 4G systems in how the frequency bands are used, for example the difference of waveforms of carrier signals or the difference of the space between carriers. Different spaces between carriers could makes the ICI more significant, so the users of single system serving both new and legacy system often suffer from the effect caused by ICI.

SUMMARY

In one of the exemplary embodiments, the disclosure is directed to a wireless communication apparatus transmitting at least one data by using a plurality of sub-carriers. The wireless communication apparatus comprises a signal modulator, a signal processor coupled to the signal modulator, a storage storing a plurality of program codes, a computing processor coupled to the signal processor and the storage, and a transmitter coupled to the signal processor. The signal modulator is configured to generate at least one modulated signal in time domain based on the at least one data. The signal processor is configured to perform signal processing on the at least one modulated signal, and comprises a window module and a filter module. The window module performs windowing operation on the at least one modulated signal to generate a window-operated signal. The filter module performs filtering operation on the window-operated signal to generate a transmitting signal in time domain. The computing processor is configured to access the program codes to perform operations of setting up the window module and the filter module respectively according to a window characteristic function and a filter characteristic function. The transmitter is configured to transmit the transmitting signal.

In one of the exemplary embodiments, the disclosure is directed to a wireless communication apparatus transmitting a plurality of data to a plurality of user equipments (UEs) by using a plurality of resource blocks (RBs), wherein each RB comprises a plurality of sub-carriers. The wireless communication apparatus comprises a signal modulator, a plurality of signal processors coupled to the signal modulator, a storage configured to store a plurality of program codes, a computing processor coupled to the signal processors and the storage, and at least one transmitter coupled to the signal processors. The signal modulator is configured to generate a plurality of modulated signals in time domain based on the data. The signal processors are configured to perform signal processing on the modulated signals, and each signal processor comprises a window module and a filter module. Each window module is configured to perform windowing operation on one of the modulated signals to generate a window-operated signal. Each filter module is configured to perform filtering operation on the window-operated signal to generate a transmitting signal in time domain. The computing processor is configured to access the program codes to perform operations of setting up the window modules and the filter modules of the signal processors respectively according to a plurality of window characteristic functions and a plurality of filter characteristic functions. The at least one transmitter is configured to transmit the transmitting signals generated by the signal processors.

In one of the exemplary embodiments, the disclosure is directed to a method of generating wireless signals. The method is applied to a wireless communication apparatus transmitting at least one data by using a plurality of sub-carriers and comprises steps of setting up a signal processor of the wireless communication apparatus according to a window characteristic function and a filter characteristic function, generating at least one modulated signal in time domain based on the at least one data, performing windowing operation on the at least one modulated signal to generate at least one window-operated signal and performing filtering operation on the at least one window-operated signal to generate at least one transmitting signal in time domain, and transmitting the at least one transmitting signal.

The foregoing will become better understood from a careful reading of a detailed description provided herein below with appropriate reference to the accompanying drawings.

DETAILED DESCRIPTION OF DISCLOSED EMBODIMENTS

Figure 1:
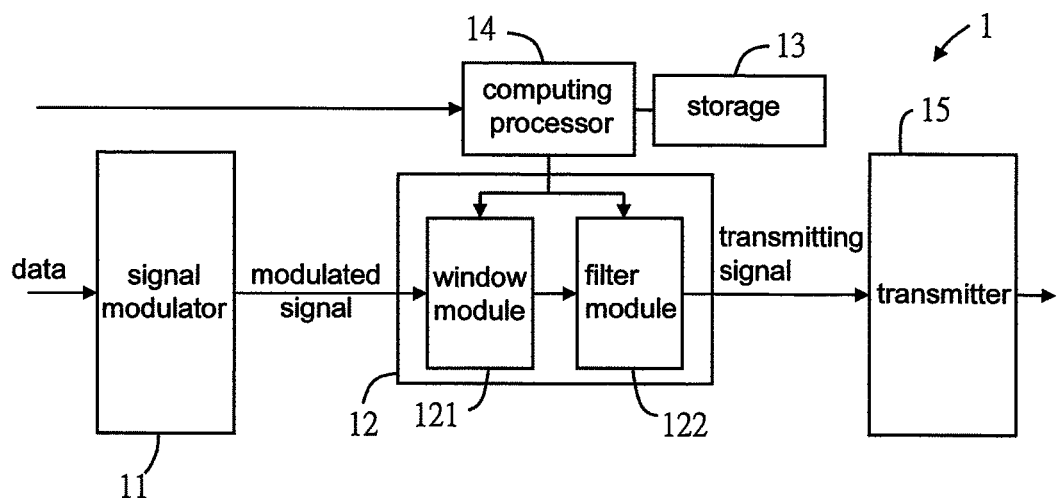
FIG. 1 is a block diagram illustrating an exemplary embodiment of a wireless communication apparatus, according to the disclosure.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

Figure 2:
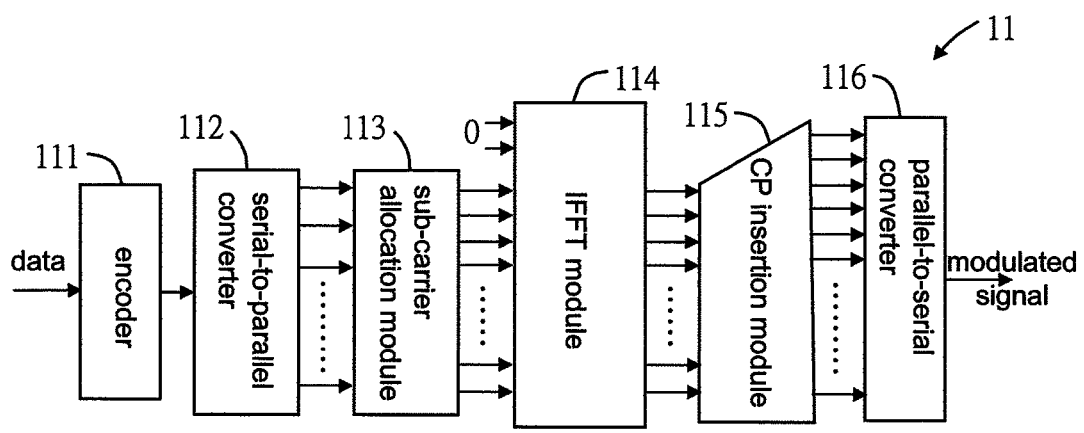
FIG. 2 is a block diagram illustrating a signal modulator of the wireless communication apparatus shown in FIG. 1, according to the disclosure.

The disclosure is directed to a wireless communication apparatus and a method thereof. FIG. 1 and FIG. 2 illustrate an exemplary embodiment of a wireless communication apparatus 1 and a signal modulator 11 of the wireless communication apparatus 1, according to the disclosure. Referring to FIG. 1 and FIG. 2, the exemplary embodiment of a wireless communication apparatus 1 may transmit at least one data by using a plurality of sub-carriers, and comprises a signal modulator 11, a signal processor 12 coupled to the signal modulator 11, a storage 13 storing a plurality of program codes, a computing processor 14 coupled to the signal processor 12 and the storage 13, and a transmitter 15 coupled to the signal processor 12.

The signal modulator 11 is configured to generate at least one modulated signal in time domain based on the at least one data, and comprises an encoder 111, a serial-to-parallel converter 112, a sub-carrier allocation module 113, an Inverse Fast Fourier Transform (IFFT) module 114, a Cyclic Prefix (CP) insertion module 115, and a parallel-to-serial converter 116.

The encoder 111 of the signal modulator 11 is configured to perform encoding to generate data symbol based on the data. The serial-to-parallel converter 112 is configured to convert data in serial to be parallel. The sub-carrier allocation module 113 is configured to perform sub-carrier allocation based on a sub-carrier allocation matrix to generate a sub-carrier allocation set according to the data symbol. The IFFT module 114 is configured to perform Inverse Fast Fourier Transform computation to generate multi-carrier signals according to the sub-carrier allocation set. The CP insertion module 115 is configured to insert a cyclic prefix into the multi-carrier signals. The parallel-to-serial converter 116 is configured to convert data in parallel to be serial. The signal modulator 11 in this disclosure may be, but not limited to an orthogonal frequency division multiplexing (OFDM) modulator. The signal modulator 11 may use generalized frequency division multiplexing technology or single-carrier frequency division multiplexing technology, and the components of the signal modulator 11 may vary when adapting different modulating technology.

The signal processor 12 is configured to perform signal processing on the at least one modulated signal, and comprises a window module 121 and a filter module 122. The window module 121 is configured to perform windowing operation and then send the signal after windowing operation to the filter module 122. The filter module 122 is configured to perform filtering operation on the signal sent from the window module 121 and send the signal after filtering operation to the transmitter 15. The signal processor 12 in this disclosure may be, but not limited to a Digital Signal Processing (DSP) chip, which will be configured to perform signal processing on the signal generated by the signal modulator 11 to depress the inter-carrier interference between sub-carriers. The signal processor 12 may be realized by such as micro-controller unit, a programmable system and so on.

The computing processor 14 is configured to access the program codes to perform operations and controls. The computing processor 14 performs an iterative out-of-band power leakage suppressing algorithm based on an out-of-band power spectral density function to estimate a window characteristic function and a filter characteristic function. Then, the computing processor 14 further performs an operation of setting up the window module 121 and the filter module 122 respectively according to the window characteristic function and the filter characteristic function. The window module 121 and the filter module 122 perform signal processing according to the window characteristic function and the filter characteristic function, respectively. The computing processor 14 in this disclosure may be a central processing unit or an MCU of different structure, or realized by cloud computing. In some other exemplary embodiments, the computing processor 14 may be co-designed with the signal processor 12 as a system on chip.

Figure 3:
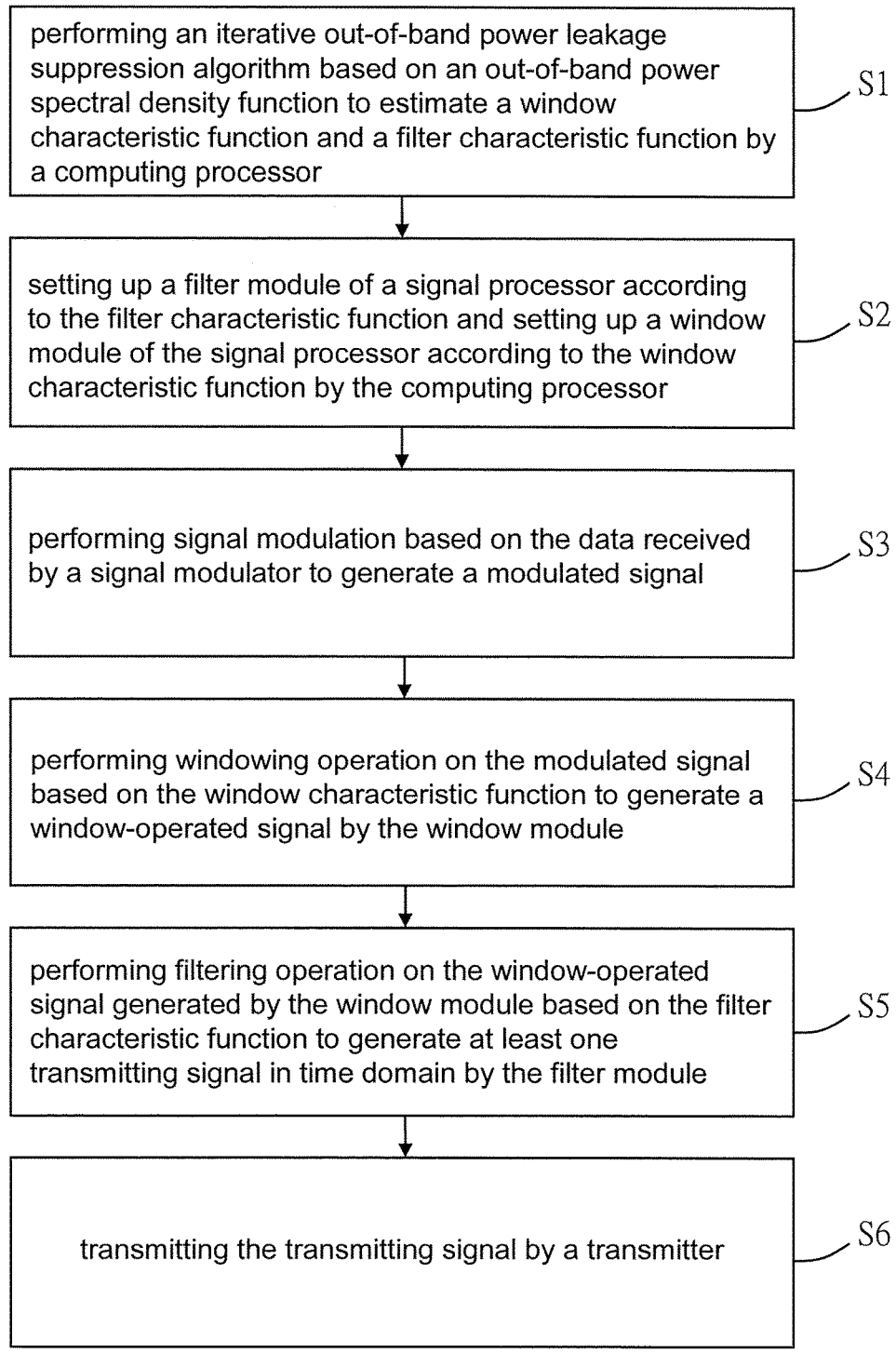
FIG. 3 is a flow chart illustrating an exemplary embodiment of a method of generating wireless signals, according to the disclosure.
Figure 4:
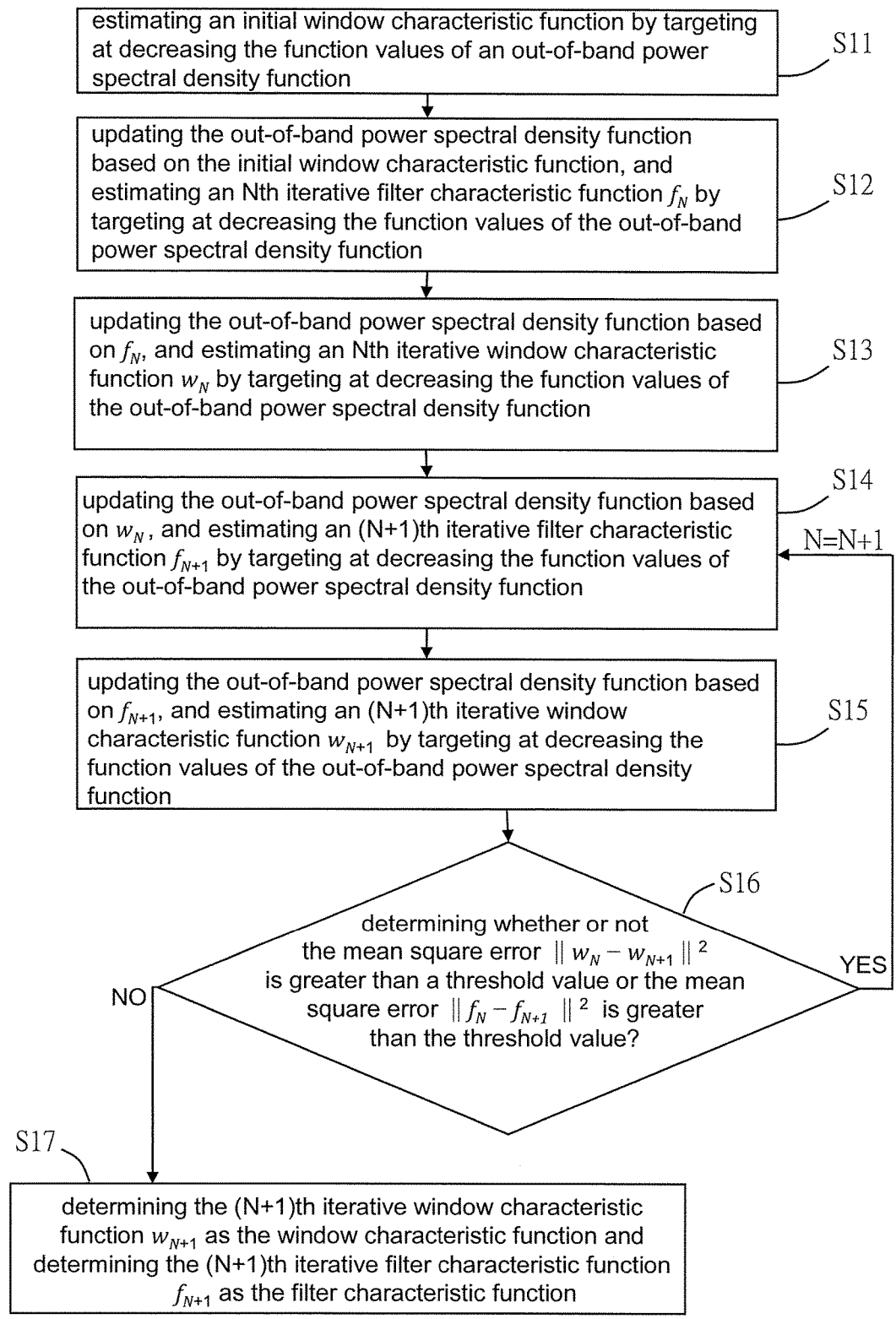
FIG. 4 is a flow chart illustrating an iterative out-of-band power leakage suppression algorithm of the method shown in FIG. 3, according to the disclosure.

FIG. 3 illustrate a method of generating wireless signals according to an exemplary embodiment of the disclosure. The exemplary embodiment for generating the wireless signals may be applied to a wireless communication apparatus 1 (shown in FIG. 1) to generate and transmit wireless signals. Referring to FIG. 3 and FIG. 4, step S1 may include performing an iterative out-of-band power leakage suppressing algorithm based on an out-of-band power spectral density function to estimate a window characteristic function and a filter characteristic function. The out-of-band power spectral density function, based on a plurality of system parameters, illustrates the power leakage out of the available frequency band for use. In other words, the out-of-band power spectral density function is to calculate the power spectrum out of the available frequency bands of resource block. The system parameters may be received by the computing processor 14 and comprise a filter characteristic function, length of the filter characteristic function, a window characteristic function, length of the window characteristic function, the quantity of the sub-carriers and the frequency positions of the sub-carriers.

Figure 5:
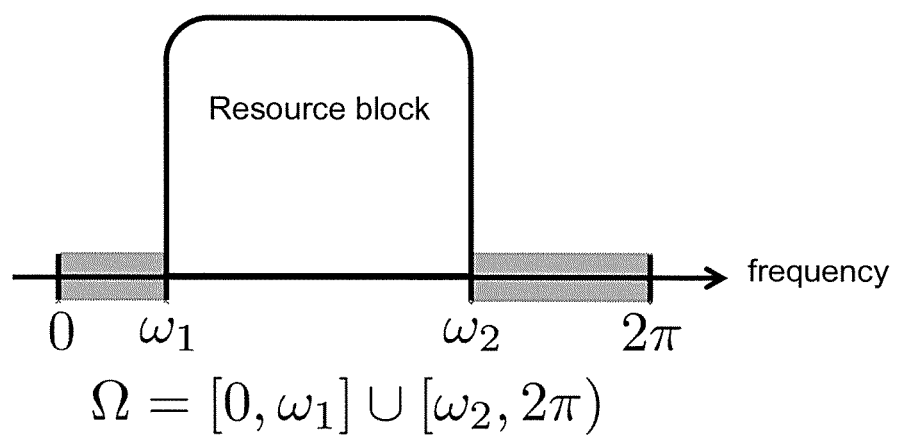
FIG. 5 shows a schematic view illustrating a resource block, according to the disclosure.

Further referring to FIG. 5, by taking the resource block having the spectrum between $\omega_1$ and $\omega_2$ as an example, the out-of-band power spectral density function is described as $$\int_{\omega \in \Omega} S_k^{(w_k, f_k)}(e^{j\omega}) d\omega, \Omega = [0, \omega_{k1}] \cup [\omega_{k2}, 2\pi]$$

wherein $S_k$ represents the signal power spectral density, $w_k$ represents the vector of window characteristic function, $f_k$ is vector of filter characteristic function, $\Omega$ represents the spectrum out of the resource blocks, k denotes the kth resource block. The signal power spectral density $S_k$ is further described as $$S_k^{(w_k, f_k)}(e^{j\omega}) = \frac{E_s}{N_s} \sum_{m \in M_k} \left| W_k\left(e^{j(\omega - \frac{2\pi}{M}m)}\right) \right|^2 |F_k(e^{j\omega})|^2,$$

wherein $E_s$ represents the transmitting energy of a data symbol, $N_s$ represents the length of transmitting signal, $M_k$ represents a set of sub-carriers, $w_k(e^{j\omega})$ represents a Fourier transform of window characteristic function associated with the kth resource block, and $F_k(e^{j\omega})$ represents a Fourier transform of filter characteristic function associated with the kth resource block.

FIG. 4 is a flow chart of an iterative out-of-band power leakage suppressing algorithm according to the exemplary embodiment of the disclosure. Referring to FIG. 4, step S11 may include estimating an initial window characteristic function by calculating function values of the out-of-band power spectral density function and targeting at decreasing the function values thereof. Step S12 may include updating the out-of-band power spectral density function by substituting the initial window characteristic function into the out-of-band power spectral density function and estimating an Nth iterative filter characteristic function by targeting at decreasing the function values of the out-of-band power spectral density function, wherein N is a positive integer presenting the Nth iteration.

To describe the window characteristic function and the filter characteristic function precisely in each iteration, the window characteristic function of the Nth iteration is denoted as $w_n$, and the filter characteristic function of the Nth iteration is denoted as $f_n$. In the present stage of the iterative out-of-band power leakage suppressing algorithm, the value of N is one standing for the first iteration, and this iteration starts from estimating a first iterative filter function $f_1$.

After obtaining the Nth iterative filter characteristic function, step S13 may include updating the out-of-band power spectral density function based on the Nth iterative filter function and estimating an Nth iterative window characteristic function by targeting at decreasing the function values of the updated out-of-band power spectral density function, that is to estimate the first iterative window characteristic function $w_1$ in this exemplary embodiment of disclosure.

Step S14 may include updating the out-of-band power spectral density function based on the Nth iterative window function and estimating an (N+1)th iterative filter characteristic function by targeting at decreasing the function values of the updated out-of-band power spectral density function, that is to estimate the second iterative filter characteristic function $f_2$ in this exemplary embodiment of disclosure.

After obtaining the (N+1)th iterative filter function, step S15 may include updating the out-of-band power spectral density function based on the (N+1)th iterative filter function and estimating an (N+1)th iterative window characteristic function by targeting at decreasing the function values of the updated out-of-band power spectral density function, that is to estimate the second iterative window characteristic function $w_2$ in this exemplary embodiment of disclosure.

After obtaining the Nth iterative filter characteristic function, the Nth iterative window characteristic function, the (N+1)th iterative filter function and the (N+1)th iterative window function, step S16 may include calculating a mean square error between the (N+1)th iterative filter characteristic function and the Nth iterative filter characteristic function $\|f_N - f_{N+1}\|^2$, and a mean square error between the (N+1)th iterative window characteristic function and the Nth iterative window characteristic function $\|w_N - w_{N+1}\|^2$. The computing processor 14 determines whether or not the mean square error $\|w_N - w_{N+1}\|^2$ is greater than a threshold value and whether or not the mean square error $\|f_N - f_{N+1}\|^2$ is greater than the threshold value.

When the mean square error $\|w_N - w_{N+1}\|^2$ is greater than the threshold value or the mean square error $\|f_N - f_{N+1}\|^2$ is greater than the threshold value, the computing processor 14 updates the out-of-band power spectral density function based on the (N+1)th iterative filter characteristic function and estimating an (N+2)th iterative window characteristic function by targeting at decreasing the function values of the updated out-of-band power spectral density function. In other words, the iterative out-of-band power leakage suppressing algorithm continues to be performed for the next iteration when the difference between the estimating results of previous two iterations is beyond the standard, that is, the threshold value.

In this exemplary embodiment of the disclosure, when the mean square error $\|w_1 - w_2\|^2$ is greater than the threshold value or the mean square error $\|f_1 - f_2\|^2$ is greater than the threshold value, the next iteration continues to be performed, that is continuing to perform the step S14 and the step S15 by replacing N with N+1 to obtain a third iterative filter characteristic function and a third iterative window characteristic function.

When the mean square error $\|w_N - w_{N+1}\|^2$ is not greater than the threshold value and the mean square error $\|f_N - f_{N+1}\|^2$ is not greater than the threshold value, step S17 is performed. Step S17 may include determining that the (N+1)th iterative window characteristic function is the window characteristic function and determining that the (N+1)th iterative filter characteristic function is the filter characteristic function. In this exemplary embodiment of the disclosure, when the mean square error $\|w_1 - w_2\|^2$ is not greater than the threshold value and the mean square error $\|f_N + f_{N+1}\|^2$ is not greater than the threshold value, the iterative out-of-band power leakage suppressing algorithm is terminated, that is stopping performing the iterative out-of-band power leakage suppressing algorithm when the function values of both the iterative window characteristic function and the iterative filter characteristic function come to a convergent value respectively.

In the iterative out-of-band power leakage suppressing algorithm, the estimated iterative filter characteristic function and the estimated iterative window characteristic function estimated in every previous two iterations, respectively are used in the next iteration in exchange for updating the out-of-band power spectral density function. In every previous two iterations, the iterative window characteristic function and the iterative filter characteristic function are estimated, respectively by targeting at decreasing the function values of the out-of-band power spectral density function to a pre-defined level (that is, suppression level). In other words, when the function values of the out-of-band power spectral density function are low enough to meet the pre-defined level, the iterative window characteristic function and the iterative filter characteristic function corresponding to the out-of-band power spectral density function are estimated, respectively. The criterion for estimating the iterative window characteristic function and the iterative filter characteristic function may be, but not limited to targeting at a suppression level of the out-of-band power spectral density function. The iterative out-of-band power leakage suppressing algorithm may further take one or more other targets, such as targeting at one or more levels of passband ripple caused by the filtering operation, and signal-to-noise ratio loss caused by the windowing operation and so on.

The factors cited by the iterative out-of-band power leakage suppressing algorithm may include, for example the length of the filter characteristic function, the length of the window characteristic function, the quantity of the sub-carriers, frequency positions of the sub-carriers, the pre-defined level, level of passband ripple, signal-to-noise ratio loss, which are determined according to channel information. However, the scope of the disclosure is not limited thereto.

After obtaining the filter characteristic function and the window characteristic function by performing the iterative out-of-band power leakage suppressing algorithm, step S2 may include setting up the filter module 122 of the signal processor 12 according to the filter characteristic function and setting up the window module 121 of the signal processor 12 according to the window characteristic function so that the filter module 122 may perform one or more filtering operations based on the filter characteristic function and the window module 121 may perform windowing operation based on the window characteristic function.

Step S3 may include performing signal modulation based on the data received by the signal modulator 11 to generate the modulated signal. An encoder 111 of the signal modulator 11 performs encoding on the data and then send encoded data to a serial-to-parallel converter 112. The serial-to-parallel converter 112 converts the encoded data from serial to parallel and then output the parallel encoded data to the sub-carrier allocation module 113. The sub-carrier allocation module 113 maps the parallel encoded data to the sub-carriers used for transmitting the parallel encoded data and generates the sub-carrier allocation set. Then, the IFFT module 114 generates the multi-carrier signal in time domain according to the sub-carrier allocation set and sends the multi-carrier signal to the CP insertion module 115. After the CP insertion module 115 inserts a CP series into the multi-carrier signal, the parallel-to-serial converter 116 converts the multi-carrier signal into a serial stream and generates the modulated signal. The signal modulator 11 sends the modulated signal to the signal processor 12. In this exemplary embodiment of the disclosure, the modulated signal may be an OFDM symbol generated by a known modulation method such as OFDM technology. No further explanation on OFDM technology will be made hereinafter.

After the signal processor 12 receives the modulated signal from the signal modulator 11, step S4 may include performing, by the window module 121 of the signal processor 12, a windowing operation on the modulated signal according to the window characteristic function to generate a window-operated signal. Step S5 may include performing, by the filter module 122 of the signal processor 12, a filtering operation on the window-operated signal generated by the window module 121 according to the filter characteristic function to generate at least one transmitting signal in time domain. Then, the filter module 122 sends the at least one transmitting signal to the transmitter 15. Step S6 may include transmitting the transmitting signal by the transmitter 15.

Since the transmitting signal sources from the modulated signal on which the window module 121 and the filter module 122 perform the windowing operation and the filtering operation successively, the at least one transmitting signal has the characteristic of low out-of-band emission signal, therefore, the inter-carrier interference (ICI) is suppressed in a multi-user and multi-carrier communication system. In this exemplary embodiment of the disclosure, the filtering operation is performed after the windowing operation, therefore, the length of the filter characteristic function is relatively shorter than that of without the windowing operation pre-processed.

Referring to FIG. 1 and FIG. 2, an exemplary embodiment of a wireless communication apparatus 1 according to the disclosure may transmit at least one data by using a plurality of sub-carriers, and comprises a signal modulator 11, a signal processor 12 coupled to the signal modulator 11, a storage 13, a computing processor 14 coupled to the signal processor 12 and the storage 13, and a transmitter 15 coupled to the signal processor 12.

The signal modulator 11 is configured to generate at least one modulated signal in time domain based on the at least one data, and comprises an encoder 111, a serial-to-parallel converter 112, a sub-carrier allocation module 113, an IFFT module 114, a CP insertion module 115, and a parallel-to-serial converter 116. The components and functions of the signal modulator 11 is same as the foregoing exemplary embodiments, and here will be no further explanation.

The signal processor 12 is configured to perform signal processing, and comprises a window module 121 and a filter module 122. The window module 121 is configured to perform windowing operation and then send the signal after windowing operation to the filter module 122. The filter module 122 is configured to perform filtering operation on the signal sent from the window module 121 and send the signal after filtering operation to the transmitter 15.

In this exemplary embodiment of the disclosure, the storage 13 stores a plurality of program codes, a plurality of candidate window characteristic functions and a plurality of candidate filter characteristic functions. The computing processor 14, configured to access the program codes to perform operations, may receive one or more condition parameters. The computing processor 14 may select one from the candidate filter characteristic functions and one from candidate window characteristic functions according to the one or more condition parameters, and then the computing processor 14 sets the window module 121 and filter module 122 respectively according to the selected candidate window characteristic function and the selected candidate filter characteristic function. The one or more condition parameters comprise at least one of out-of-band power suppression level and signal-to-noise ratio loss. The computing processor 14 performs computing according to each of the candidate window characteristic functions and each of the candidate filter characteristic functions, and compares the computing results with the condition parameters. Then, the computing processor 14 sets the window module 121 and the filter module 122 according to the one having the computing results closest to the condition parameters among the candidate filter characteristic functions and the one having the computing result closest to the condition parameters among the candidate window characteristic functions, respectively.

The computing processor 14 in this exemplary embodiment of the disclosure may be central processing unit or an MCU of different structure, or realized by cloud computing. In some other exemplary embodiments, the computing processor 14 may be co-designed with the signal processor 12 as a system on chip.

Figure 6:
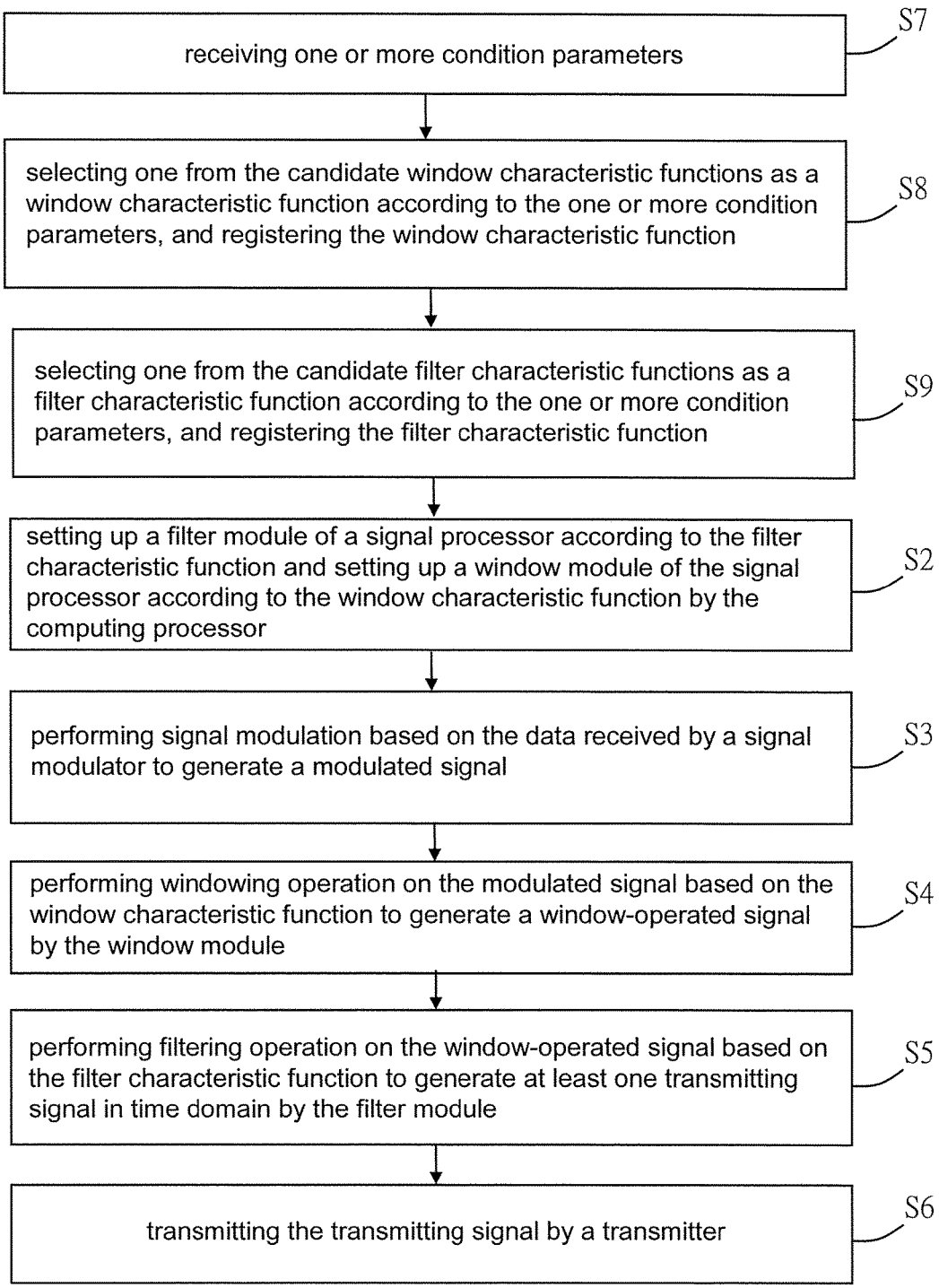
FIG. 6 is a flow chart illustrating another exemplary embodiment of a method of generating wireless signals, according to the disclosure.

FIG. 6 is a flow chart of a method of generating wireless signals according to an exemplary embodiment of the disclosure. Further referring to FIG. 6, the exemplary embodiment of the method may be applied to a wireless communication apparatus 1 (shown in FIG. 1) to generate and transmit wireless signals. Step S7 may include receiving the condition parameters. After receiving the condition parameters, step S8 may include selecting one from the candidate window characteristic functions as the window characteristic function according to the condition parameters, and registering the selected window characteristic function. Then, step S9 may include selecting one from the candidate filter characteristic functions as the filter characteristic function according to the condition parameters, and registering the selected filter characteristic function.

After step S8 and step S9, step S2 may include setting up the window module 121 and the filter module 122 of the signal processor 12 according to the selected window characteristic function and the selected filter characteristic function, respectively, so that the filter module 122 may perform the filtering operation according to the filter characteristic function and the window module 121 may perform the windowing operation according to the window characteristic function.

Step S3 may include receiving the data and performing modulation on the data to generate the modulated signal by the signal modulator 11 of the wireless communication apparatus 1. The signal modulator 11 further sends the modulated signal to the signal processor 12. In this exemplary embodiment of the disclosure, the modulated signal may be OFDM symbol generated by OFDM technology.

After the signal processor 12 receives the modulated signal, step S4 may include performing the windowing operation on the modulated signal according to the selected window characteristic function to generate the window-operated signal by the window module 121 of signal processor 12. Then, step S5 may include performing the filtering operation on the window-operated signal according to the selected filter characteristic function to generate the at least one transmitting signal in time domain by the filter module 122 of signal processor 12. The filter module 122 sends the at least one transmitting signal to the transmitter 15. Step S6 may include transmitting the at least one transmitting signal by the transmitter 15.

Since the at least one transmitting signal sources from the modulated signal on which the window module 121 and the filter module 122 perform the windowing operation and the filtering operation successively, the at least one transmitting signal has the characteristic of low out-of-band emission signal, therefore, the inter-carrier interference (ICI) is suppressed in a multi-user and multi-carrier communication system. In this exemplary embodiment of the disclosure, the filtering operation is performed after the windowing operation, therefore, the length of the filter characteristic function is relatively shorter than that of without the windowing operation pre-processed.

Figure 7:
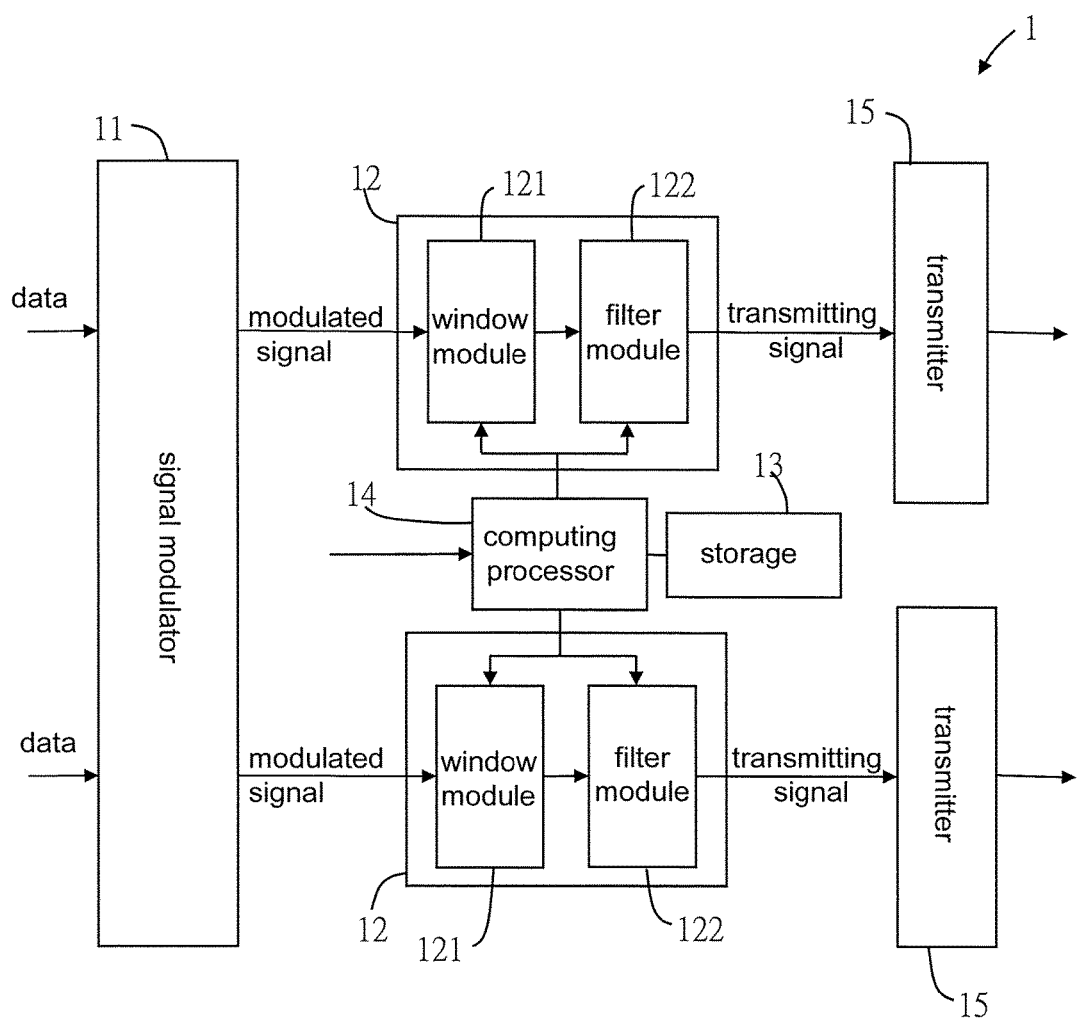
FIG. 7 is a block diagram illustrating another exemplary embodiment of a wireless communication apparatus, according to the disclosure.
Figure 8:
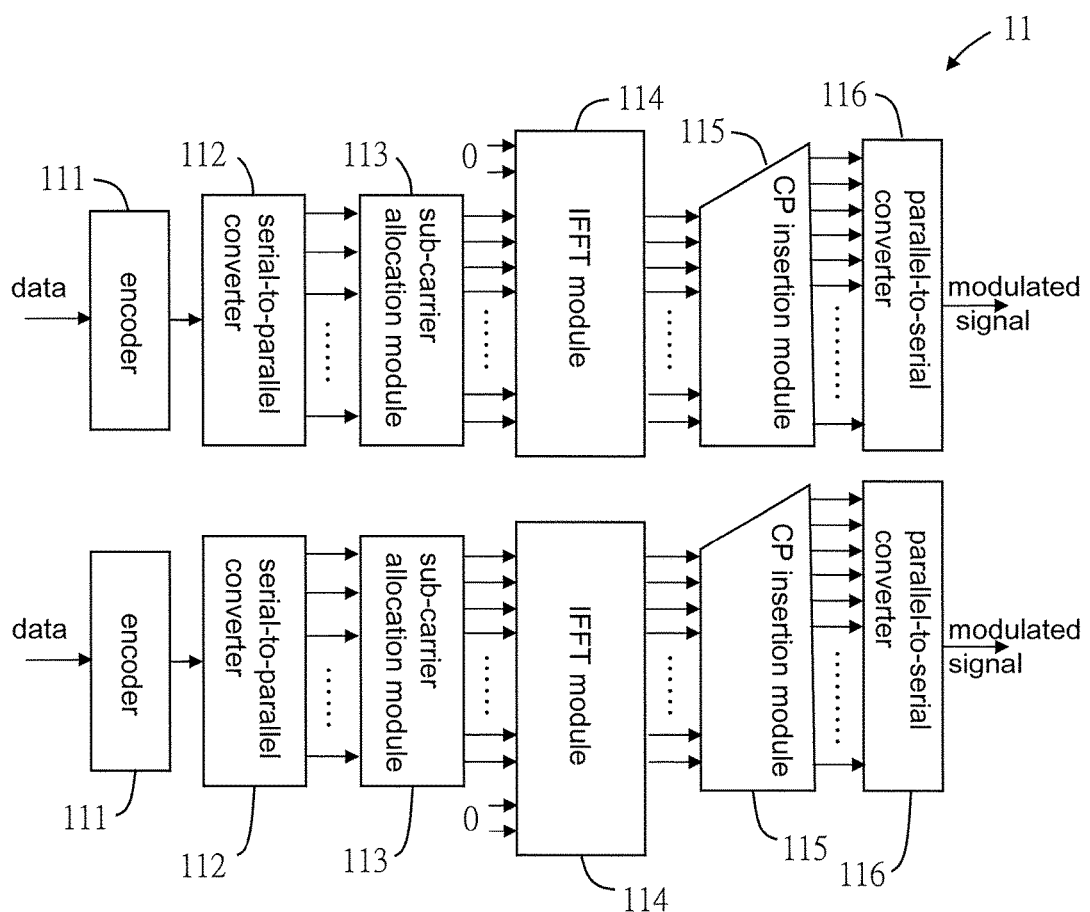
FIG. 8 is a block diagram illustrating a signal modulator of the wireless communication apparatus shown in FIG. 7, according to the disclosure.

FIG. 7 and FIG. 8 illustrate respectively a wireless communication apparatus 1 and a block diagram of a signal modulator 11 according to an exemplary embodiment of the disclosure. Referring to FIG. 7 and FIG. 8, the wireless communication apparatus 1 may transmit a plurality of data to a plurality of user equipments (UEs) by using a plurality of resource blocks (RBs). Each RB comprises a plurality of sub-carriers. The wireless communication apparatus 1 comprises the signal modulator 11, a plurality of signal processors 12 coupled to the signal modulator 11, the storage 13 storing a plurality of program codes, the computing processor 14 coupled to the signal processors 12 and the storage 13, and a transmitter 15 coupled to the signal processors 12. In this exemplary embodiment of the disclosure, the wireless communication apparatus 1 transmits data to two UEs respectively by using two RBs. One of the two RBs is adapted to transmit data to a first UE (not shown in FIGs), while the other one of the two RBs is adapted to transmit data to a second UE (not shown in FIGs).

The signal modulator 11 is configured to generate a plurality of modulated signals in time domain based on the data, and comprises a plurality of encoders 111 corresponding to the RBs respectively, a plurality of serial-to-parallel converters 112 corresponding to the RBs respectively, a plurality of sub-carrier allocation modules 113 corresponding to the RBs respectively, a plurality of IFFT modules 114 corresponding to the RBs respectively, a plurality of CP insertion modules 115 corresponding to the RBs respectively, and a plurality of parallel-to-serial converters 116 corresponding to the RBs respectively. The modulated signal corresponding to one of the RBs is generated by performing a modulation on the data to be transmitted via the one of the RBs by one of the encoders 111, one of the serial-to-parallel converters 112, one of the sub-carrier allocation modules 113, one of the IFFT modules 114, one of the CP insertion modules 115 and one of the parallel-to-serial converters 116.

In this exemplary embodiment of the disclosure, the signal modulator 11 is adapted to two RBs, so the quantity of each kind of components of the signal modulator 11 is two, wherein one corresponds to a first RB for processing the signal to be transmitted via the first RB, while the other corresponds to a second RB for processing the signal supposed to be transmitted via the second RB.

The functions and the operations of each encoder 111, each serial-to-parallel converter 112, each sub-carrier allocation module 113, each the IFFT module 114, each the CP insertion module 115, and each parallel-to-serial converter 116 in this exemplary embodiment of the disclosure are same as those of corresponding components of FIG. 2, respectively, and have been explained in foregoing paragraphs, so no further explanation will be made here.

The signal processors 12 corresponding to the RBs respectively are configured to perform signal processing. In this exemplary embodiment of the disclosure, the quantity of the signal processors 12 is two, wherein one corresponds to the first RB for processing the signal supposed to be transmitted via the first RB, while the other corresponds to the second RB for processing the signal supposed to be transmitted via the second RB.

Each signal processor 12 comprises a window module 121 and a filter module 122 wherein the window module 121 is configured to perform the windowing operation and the filter module 122 is configured to perform the filtering operation. The window module 121 sends the signal after the windowing operation to the filter module 122. Then, the filter module 122 performs the filtering operation on the signal sent from the window module 121 and sends the signal after the filtering operation to the transmitter 15. Each signal processor 12 in this disclosure may be, but not limited to, a Digital Signal Processing (DSP) chip configured to perform signal processing on the signals generated by the signal modulator 11 to depress the inter-carrier interference between sub-carriers. Each signal processor 12, may also be realized by a micro-controller unit or a programmable system.

The computing processor 14 is configured to access the program codes to perform operations. The computing processor 14 performs an iterative out-of-band power leakage suppressing algorithm based on a plurality of out-of-band power spectral density functions associated with the RBs, respectively, to estimate a plurality of window characteristic functions and a plurality of filter characteristic functions associated with the RBs respectively. Then, the computing processor 14 further sets up the window modules 121 and the filter modules 122, respectively, according to the window characteristic functions and the filter characteristic functions. The window modules 121 perform signal processing according to the window characteristic functions respectively. The filter modules 122 perform signal processing according to the filter characteristic functions respectively. The computing processor 14 in this disclosure may be a central processing unit or MCU of different structures, or an realized by cloud computing. In some other exemplary embodiments, the computing processor 14 may be co-designed with the signal processors 12 as a system on chip.

Figure 9:
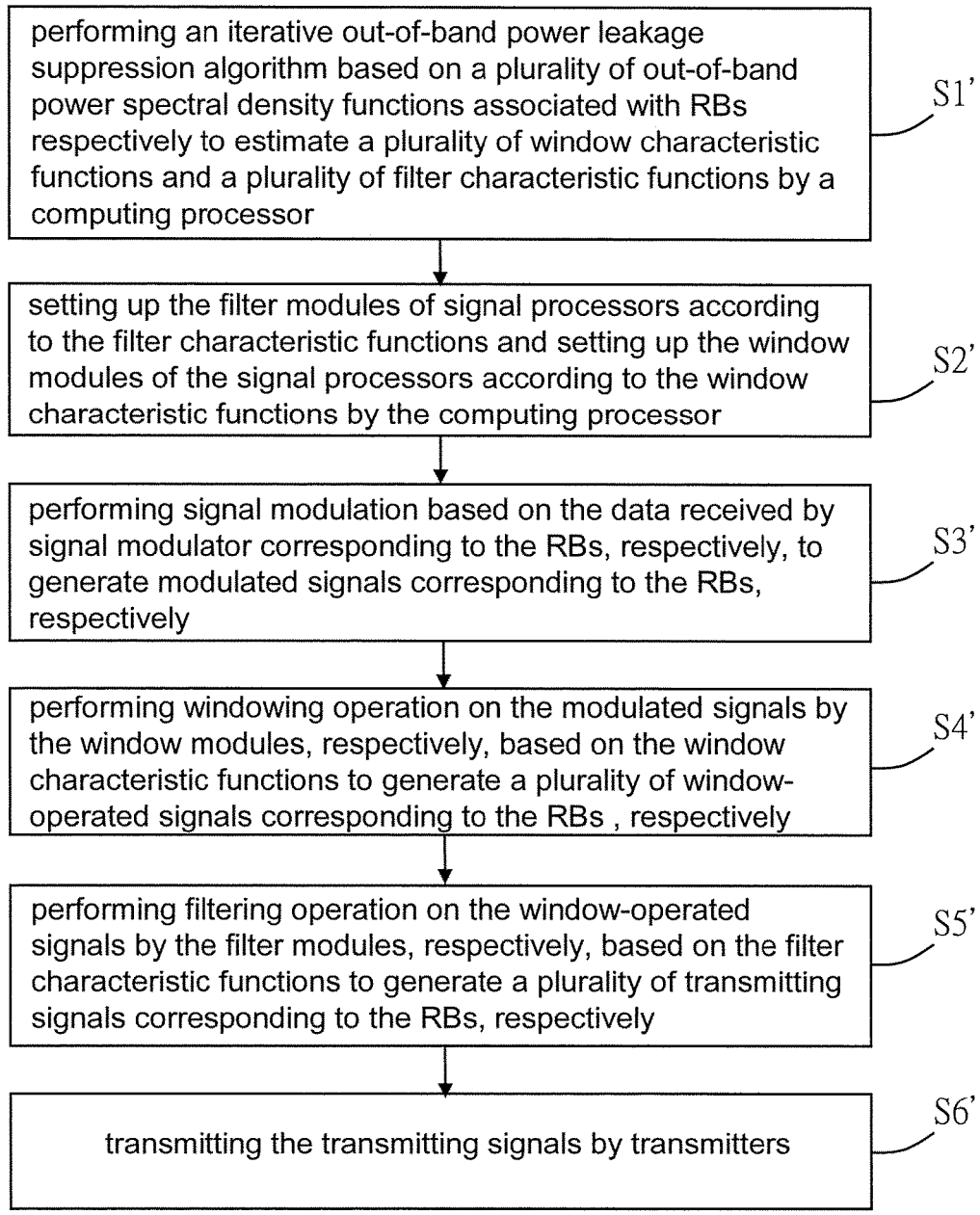
FIG. 9 is a flow chart illustrating another exemplary embodiment of a method of generating wireless signals, according to the disclosure.
Figure 10:
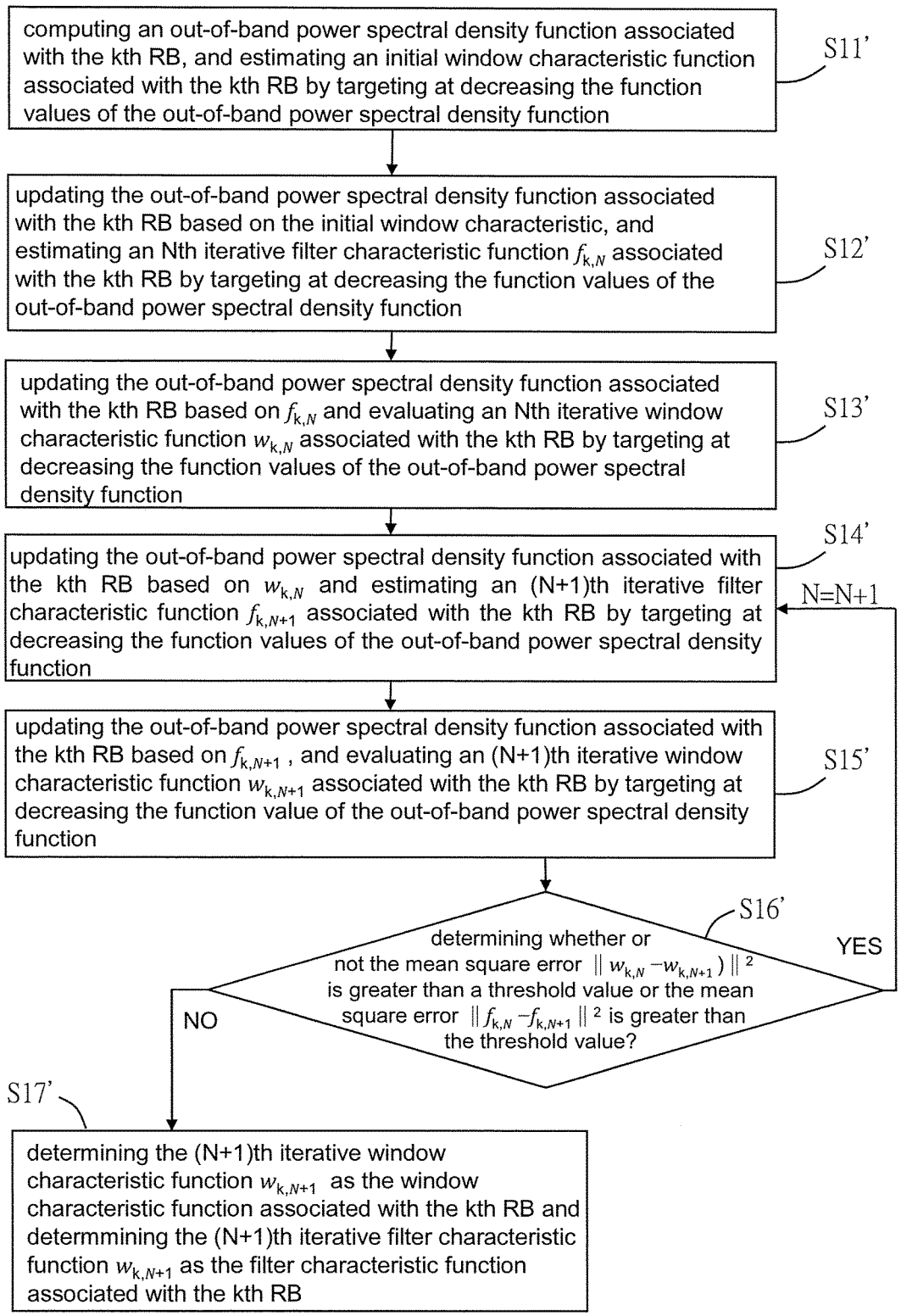
FIG. 10 is a flow chart illustrating an iterative out-of-band power leakage suppressing algorithm for the first resource block, according to the disclosure.

FIG. 9 and FIG. 10. illustrate a method of generating wireless signals and an iterative out-of-band power leakage suppressing algorithm corresponding to the kth RB, respectively, according to an exemplary embodiment of the disclosure. Referring to FIG. 9 and FIG. 10, the method of generating wireless signals may be applied to a wireless communication apparatus 1 (shown in FIG. 7) to generate and transmit wireless signals.

Further referring to FIG. 7, step S1' may include performing an iterative out-of-band power leakage suppressing algorithm based on a plurality of out-of-band power spectral density functions associated with the RBs respectively to estimate a plurality of window characteristic functions and a plurality of filter characteristic functions. Each out-of-band power spectral density function, based on a plurality of system parameters, illustrates the power leakage out of the frequency band, that is to say, the out-of-band power spectral density function is to calculate the power leakage out of the frequency band of specific resource blocks. The system parameters may be received by the computing processor 14 and comprise a filter characteristic function, length of the filter characteristic function, a window characteristic function, length of the window characteristic function, quantity of the sub-carriers and frequency positions of the sub-carriers, so the out-of-band power spectral density functions vary with different RBs. The computing processor 14 performs the iterative out-of-band power leakage suppressing algorithm according to the out-of-band power spectral density functions associated with different RBs.

In this exemplary embodiment of disclosure, the wireless communication apparatus 1 may transmit data by using K resource blocks (RBs), wherein K is a positive integer. The out-of-band power spectral density function associated with the kth RB is used for computing the power leakage out of the frequency band of the kth RB. The frequency band of the kth RB, for example, is a frequency band between $\omega_{k1}$ and $\omega_{k2}$ so that the out-of-band power spectral density function associated with the kth RB is denoted as $$\int_{\omega \in \Omega} S_k^{(w_k, f_k)}(e^{j\omega}) d\omega, \Omega = [0, \omega_{k1}] \cup [\omega_{k2}, 2\pi]$$

wherein $S_k$ represents the signal power spectral function, $w_k$ represents the vector of window characteristic function, $f_k$ represents the vector of filter characteristic function, $\Omega$ represents the power spectral out of the RB, k denotes the kth RB. The signal power spectral function $S_k$ is denoted as $$S_k^{(w_k, f_k)}(e^{j\omega}) = \frac{E_s}{N_s} \sum_{m \in M_k} \left| W_k\left(e^{j(\omega - \frac{2\pi}{M}m)}\right) \right|^2 |F_k(e^{j\omega})|^2$$

wherein $E_s$ represents the transmitting energy of a data symbol, $N_s$ represents the length of the transmitting signals, $M_k$ represents a set of used sub-carriers, and $W_k(e^{j\omega})$ represents the Fourier transform of the window characteristic function associated with the kth RB, and $F_k(e^{j\omega})$ represents the Fourier transform of the filter characteristic function associated with the kth RB.

The computing processor 14 performs the iterative out-of-band power leakage suppressing algorithm according to the out-of-band power spectral density functions, associated with k RBs, respectively and successively from the 1st RB to kth RB. For clarity, the following explanation will describe steps of the iterative out-of-band power leakage suppressing algorithm of the kth RB as an example. Step S11' may include computing the out-of-band power spectral density function for the kth RB, and estimating an initial window characteristic function associated with the kth RB by targeting at decreasing the function values of the out-of-band power spectral density function. Step S12' may include updating the out-of-band power spectral density function associated with the kth RB according to the initial window characteristic function associated with the kth RB, and estimating an Nth iterative filter characteristic function associated with the kth RB by targeting at decreasing the function values of the out-of-band power spectral density function associated with the kth RB, wherein N is a positive integer and denotes the Nth iteration. To denote each iteration clearly, the Nth iterative window characteristic function is denoted as $w_{k,n}$ and the Nth iterative filter characteristic function is denoted as $f_{k,n}$. In the present stage of the iterative out-of-band power leakage suppressing algorithm, N is assigned as one to denote the first iteration that is to estimate the first iterative filter characteristic function $f_{k,1}$ associated with the kth RB.

After obtaining the Nth iterative filter characteristic function associated with the kth RB, step S13' may include updating the out-of-band power spectral density function associated with the kth RB according to the Nth iterative filter characteristic function associated with the kth RB into the out-of-band power spectral density function and estimating an Nth iterative window characteristic function associated with the kth RB by targeting at decreasing the function values of the updated out-of-band power spectral density function associated with the kth RB, that is to estimate the first iterative window characteristic function $w_{k,1}$ associated with the kth RB.

After obtaining the Nth iterative window characteristic function associated with the kth RB, step S14' may include updating the out-of-band power spectral density function associated with the kth RB according to the Nth iterative window characteristic function associated with the kth RB and estimating an (N+1)th iterative filter characteristic function associated with the kth RB by targeting at decreasing the function values of the updated out-of-band power spectral density function associated with the kth RB, that is to estimate the second iterative filter characteristic function $f_{k,2}$ associated with the kth RB.

After obtaining the (N+1)th iterative filter characteristic function associated with the kth RB, step S15' may include updating the out-of-band power spectral density function associated with the kth RB according to the (N+1)th iterative filter characteristic function associated with the kth RB and estimating an (N+1)th iterative window characteristic function associated with the kth RB by targeting at decreasing the function values of the updated out-of-band power spectral density function associated with the kth RB, that is to estimate the second iterative window characteristic function $w_{k2}$ associated with the kth RB.

After obtaining the Nth iterative filter characteristic function $f_{k,N}$, the Nth iterative window characteristic function $w_{k,N}$, the (N+1)th iterative filter characteristic function $f_{k,N+1}$, and the (N+1)th iterative window characteristic function $w_{k,N+1}$, step S16' may include calculating the mean square error $\|f_{k,N}-f_{k,N+1}\|^2$ between the Nth and the (N+1)th iterative filter characteristic functions associated with the kth RB, and calculating the mean square error $\|w_{k,N}-w_{k,N+1}\|^2$ between the Nth and the (N+1)th iterative window characteristic functions associated with the kth RB. The computing processor 14 determines whether or not the mean square error $\|w_{k,N}-w_{k,N+1}\|^2$ is greater than a threshold value and whether or not the mean square error $\|f_{k,N}-f_{k,N+1}\|^2$ is greater than the threshold value.

As the mean square error $\|f_{k,N}-f_{k,n+1}\|^2$ is greater than a threshold value or the mean square error $\|w_{k,N}-w_{k,N+1}\|^2$ is greater than the threshold value, the computer processor 14 of the wireless communication apparatus 1 updates the out-of-band power spectral density function associated with the kth RB according to the (N+1)th iterative filter characteristic function associated with the kth RB, and then the computer processor 14 estimates an (N+2)th window characteristic function associated with the kth RB by targeting at decreasing the function values of the updated out-of-band power spectral density function associated with the kth RB. In other words, when the difference between the estimating results of the previous two iterations is beyond the standard, that is the threshold value, the iterative out-of-band power leakage suppressing algorithm is performed continuously for the next iteration.

In this exemplary embodiment of the disclosure, when the mean square error $\|w_{k,1}-w_{k,2}\|^2$ is greater than the threshold value or the mean square error $\|f_{k,1}-f_{k,2}\|^2$ is greater than the threshold value, the iterative out-of-band power leakage suppressing algorithm is performed for the next iteration, that is continuing to perform step S14' and step S15', wherein the N is replaced by N+1, and obtaining a third filter characteristic function and a 3rd window characteristic function.

As the mean square error $\|f_{k,N}-f_{k,n+1}\|^2$ is not greater than a threshold value and the mean square error $\|w_{k,N}-w_{k,N+1}\|^2$ is not greater than the threshold value, step S17' may include assigning the (N+1)th iterative window characteristic function as the window characteristic function associated with the kth RB and assigning the (N+1)th iterative filter characteristic function as the filter characteristic function associated with the kth RB. In this exemplary embodiment of the disclosure, as the mean square error between the first and the second iterative window characteristic functions is not greater than the threshold value and the mean square error between the first and the second iterative filter characteristic function is not greater than the threshold value, the iterative out-of-band power leakage suppressing algorithm for the kth RB is terminated, that is stopping performing the iterative out-of-band power leakage suppressing algorithm for the kth RB when both the iterative window characteristic function associated with the kth RB and the iterative filter characteristic function associated with the kth RB both come to a convergent value respectively.

In the iterative out-of-band power leakage suppressing algorithm for the kth RB, the iterative filter characteristic function associated with the kth RB estimated in each iteration or the iterative window characteristic function associated with the kth RB in each iteration will be used in the next iteration to update the out-of-band power spectral density function associated with the kth RB. In each iteration, the iterative window characteristic function and the iterative filter characteristic function are estimated by targeting at decreasing the function values of the updated out-of-band power spectral density function associated with the kth RB to a pre-defined level (that is, suppression level), that is, when the function value of the out-of-band power spectral density function is low enough to meet the pre-defined level, the iterative window characteristic function and the iterative filter characteristic function are estimated, respectively. The target for estimating the iterative window characteristic function and the iterative filter characteristic function may be, but not limited to a suppression level of decreasing the function values of the out-of-band power spectral density function. However, in additional to the aforesaid suppression level, the iterative out-of-band power leakage suppressing algorithm may take one or more estimation targets, such as at least one combination of level of passband ripple caused by the filtering operation, and level of the signal-to-noise ratio loss caused by the windowing operation.

The factors cited by the iterative out-of-band power leakage suppressing algorithm for each RB may be, for example the length of the filter characteristic function, the length of the window characteristic function, the quantity of the sub-carriers, the frequency positions of the sub-carriers, the pre-defined level, the level of passband ripple, and the signal-to-noise ratio loss. These factors may be determined according to the channel information of each RB, but the scope of the disclosure is not limited thereto.

After obtaining the filter characteristic functions and the window characteristic functions associated with the RBs respectively by performing the iterative out-of-band power leakage suppressing algorithm, step S2' may include setting up the filter modules 122 of the signal processor 12 according to the filter characteristic functions and setting up the window modules 121 according to the window characteristic functions so that the filter modules 122 may perform the filtering operation according to the filter characteristic functions respectively and the window modules 121 may perform the windowing operation according to the window characteristic functions respectively.

Step S3' may include performing signal modulation based on the data received by the signal modulators 11 corresponding to the RBs respectively to generate the modulated signals corresponding to the RBs respectively. Since the components of each signal modulator 11 are the same, the following explanation will be described by taking the signal modulator 11 corresponding to the kth RB as an example. The encoder 111 of the signal modulator 11 receives the data to be transmitted via the kth RB, and performs encoding on the data. Then, the encoded data is sent to the serial-to-parallel converter 112 of the signal modulator 11. The serial-to-parallel converter 112 converts the encoded data from serial to parallel and then sends the parallel encoded data to the sub-carrier allocation module 113 of the signal modulator 11. The sub-carrier allocation module 113 maps the parallel encoded data to the sub-carriers used for transmitting the parallel encoded data, and generates the sub-carrier allocation set. Then, the IFFT module 114 of the signal modulator 11 generates a multi-carrier signal in time domain according to the sub-carrier allocation set and sends the multi-carrier signal to a CP insertion module 115 of the signal modulator 11. After the CP insertion module 115 inserts a CP series into the multi-carrier signal, the parallel-to-serial converter 116 converts the multi-carrier signal into serial stream and generates a modulated signal. The signal modulator 11 sends the modulated signal to the signal processor 12. In this exemplary embodiment of the disclosure, the modulated signals may be OFDM symbols generated by known modulation method such as an OFDM technology, so no further explanation will be made hereinafter.

After the signal processor 12 receives the modulated signals from each signal modulator 11, step S4' may include performing windowing operations on the modulated signals by the window modules 121 respectively according to the window characteristic functions to generate a plurality of window-operated signals. Take the kth RB as an example. The window module 121 performs a windowing operation on the modulated signal corresponding to the kth RB, and the modulated signal is transformed into a window-operated signal corresponding to the kth RB.

After the filter modules 122 receives the window-operated signals, step S5' may include performing filtering operations on the window-operated signals by the filter modules 122 respectively, according to the filter characteristic functions to generate a plurality of transmitting signals corresponding to the RBs, respectively. Then, the filter modules 122 send the transmitting signals to the transmitters 15. Take the kth RB as an example. The filter module 122 performs a filter operation on the window-operated signal corresponding to the kth RB, and the window-operated signal is transformed into a transmitting signal corresponding to the kth RB. Step S6' may include transmitting the transmitting signals.

In this exemplary embodiment of the disclosure, the wireless communication apparatus 1 may transmit signals to user equipments by using, for example, two RBs so that the computing processor 14 estimates the filter characteristic functions associated with the first RB and the second RB respectively and estimates the window characteristic functions associated with the first RB and the second RB respectively. The computing processor 14 of the wireless communication apparatus 1 sets up the signal processor 12 corresponding to the first RB according to the filter characteristic function and the window characteristic function associated with the first RB. The signal processor 12 performs the filtering operation and the windowing operation on the modulated signal corresponding to the first RB, and generates the transmitting signal corresponding to the first RB. The computing processor 14 sets up the signal processor 12 corresponding to the second RB according to the filter characteristic function and the window characteristic function associated with the second RB. The signal processor 12 performs the filtering operation and the windowing operation on the modulated signal corresponding to the second RB, and generates the transmitting signal corresponding to the second RB.

Since the transmitting signals sources from the modulated signals on which the window modules 121 and the filter modules 122 perform the windowing operation and the filtering operation successively, the transmitting signals have the characteristic of low out-of-band emission, therefore, the inter-carrier interference in suppressed in a multi-user and multi-carrier communication system. In this exem-plary embodiment of the disclosure, the filtering operation is performed after the windowing operation, therefore, the length of the filter characteristic functions are relatively shorter than that of without the windowing operation pre-processed.

Referring to FIG. 7 and FIG. 8, an exemplary embodiment of a wireless communication apparatus 1 according to the disclosure may transmit a plurality of data to a plurality of user equipments (not shown in FIGs) by using a plurality of resource blocks (RBs), wherein each RB comprises a plurality of sub-carriers. The wireless communication apparatus 1 comprises the signal modulator 11, the plurality of signal processors 12 coupled to the signal modulator 11, the storage 13, the computing processor 14 coupled to the signal processors 12 and the storage 13, and the transmitter 15 coupled to the signal processors 12.

The signal modulator 11 is configured to generate a plurality of modulated signals in time domain based on the data, and comprises the plurality of encoders 111 corresponding to the RBs respectively, the plurality of serial-to-parallel converters 112 corresponding to the RBs respectively, the plurality of sub-carrier allocation modules 113 corresponding to the RBs respectively, the plurality of IFFT modules 114 corresponding to the RBs respectively, the plurality of CP insertion modules 115 corresponding to the RBs respectively, and the plurality of parallel-to-serial converters 116 corresponding to the RBs respectively. The modulated signal corresponding to one of the RBs is generated by performing a modulation on the data to be transmitted via one of the RBs by one of the encoders 111, one of the serial-to-parallel converters 112, one of the sub-carrier allocation modules 113, one of the IFFT modules 114, one of the CP insertion modules 115 and one of the parallel-to-serial converters 116. The functions and the operations of the signal modulator 11 have been explained in foregoing paragraphs, so no further explanation will be made here.

In this exemplary embodiment of disclosure, the signal processors 12 respectively correspond to the RBs, respectively. In other words, different signal processors 12 perform signal processing on signals to be transmitted via different RBs, respectively. Each signal processor 12 comprises a window module 121 and a filter module 122. The window module 121 performs the windowing operation on the modulated signal and sends the window-operated signal to the filter module 122. The filter module 122 performs the filtering operation on the signal operated by the window module 121 and sends the transmitting signal to the transmitter 15.

The storage 13 stores a plurality of program codes, a plurality of candidate window characteristic functions and a plurality of candidate filter characteristic functions. The computing processor 14, configured to access the program codes to perform operations and controls, may receive one or more condition parameters. The computing processor 14 may selects several ones from the candidate filter characteristic functions and several ones from the candidate window characteristic functions according to the one or more condition parameters, and then the computing processor 14 sets up the window modules 121 and the filter modules 122 respectively according to the selected candidate window characteristic functions and the selected candidate filter characteristic functions.

The computing processor 14 in this exemplary embodiment of the disclosure may be a central processing unit or an MCU of different structures, or realized by cloud computing.

In some other exemplary embodiment, the computing processor 14 may be co-designed with the signal processors 12 as a system on chip.

Figure 11:
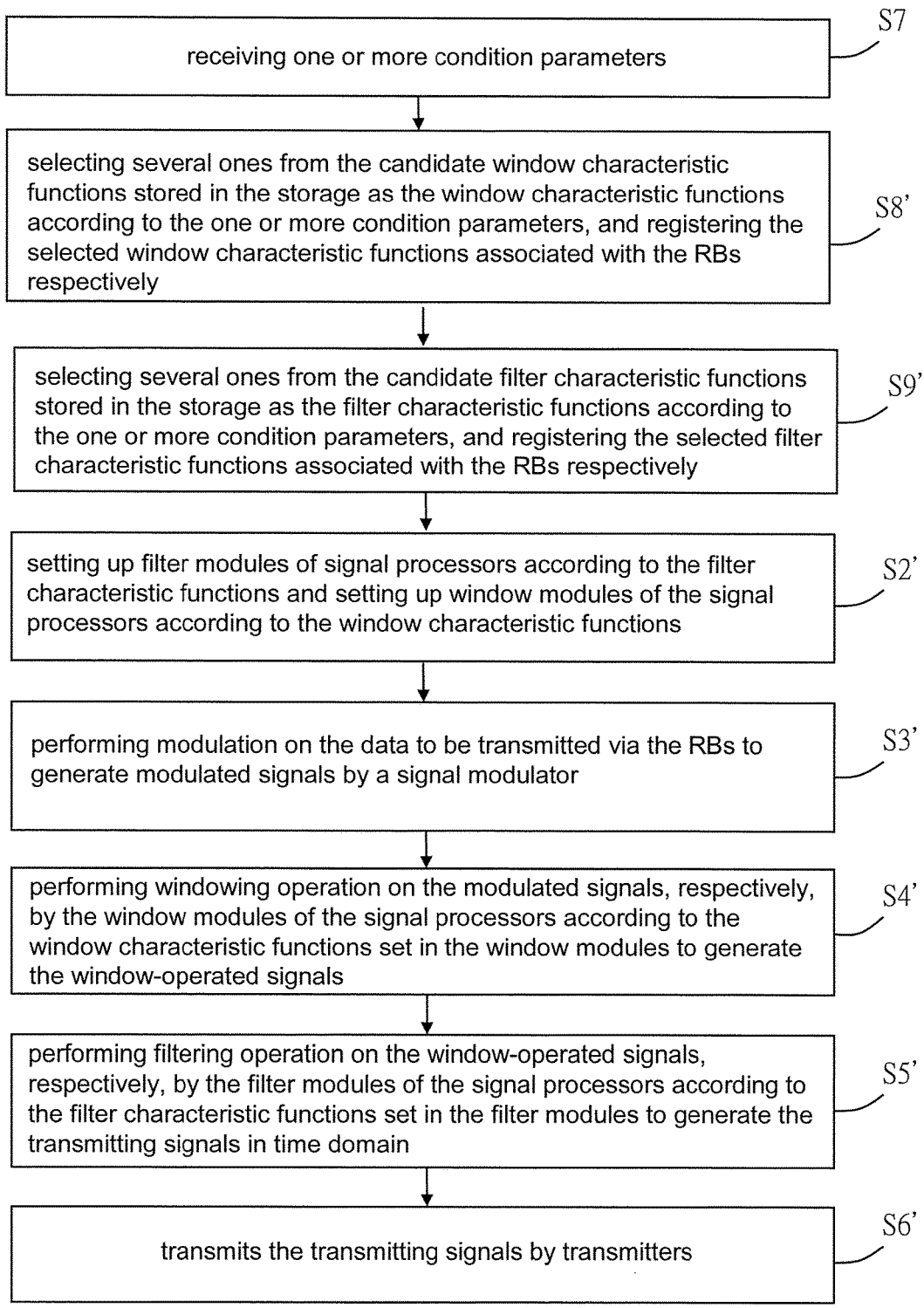
FIG. 11 is a flow chart illustrating yet another exemplary embodiment of a method of generating wireless signals, according to the disclosure.

FIG. 11 is a flow chart of a method of generating wireless signals according to yet another exemplary embodiment of the disclosure, and the method may be applied to a wireless communication apparatus 1 (shown in FIG. 7) to generate and transmit wireless signals.

Step S7 may include receiving the one or more condition parameters. After receiving the one or more condition parameters, step S8' may include selecting several ones from the candidate window characteristic functions stored in the storage 13 as the window characteristic functions according to the one or more condition parameters, and registering the selected window characteristic functions associated with the RBs respectively. Then, step S9' may include selecting several ones from the candidate filter characteristic functions stored in the storage 13 as the filter characteristic functions according to the one or more condition parameters, and registering the selected filter characteristic functions associated with the RBs respectively. The one or more condition parameters may comprise at least one of out-of-band power leakage suppression level and signal-to-noise ratio loss. The computing processor 14 performs computing according to each candidate window characteristic function and each candidate filter characteristic function, and compares the computing results with the condition parameters for each RB. Then, the computing processor 14 selects the several ones from candidate window characteristic functions and the several ones from candidate filter characteristic functions respectively, that the computing results of the selected candidate filter characteristic functions and the selected candidate filter characteristic functions closest to the condition parameters, then registers them. In this exemplary example of the disclosure, taking the kth RB for transmitting wireless signals as an example, the computing processor 14 selects the window characteristic function associated with the kth RB and the filter characteristic function associated with the kth RB, respectively, according to the condition parameters.

After obtaining the window characteristic functions and the filter characteristic functions associated with each RBs, respectively, step S2' may include setting up the filter modules 122 of the signal processors 12 according to the filter characteristic functions and setting up the window modules 121 of the signal processors 12 according to the window characteristic functions, respectively, so the filter modules 122 may perform the filtering operation according to the filter characteristic functions respectively and the window modules 121 may perform the windowing operation according to the window characteristic functions respectively. In this exemplary example of the disclosure, taking the signal processor 12 associated with the kth RB as an example, the computing processor 14 sets up the filter module 122 and the window module 121 of the signal processor 12 associated with the kth RB according to the filter characteristic function associated with the kth RB and the window characteristic function associated with the kth RB, so the filter module 122 may perform the filtering operation according to the filter characteristic function associated with the kth RB and the window module 121 may perform the windowing operation according to the window characteristic function associated with the kth RB.

Take this exemplary embodiment of the disclosure adapted to two available RBs as an example. The quantity of available RBs is two so that the computing processor 14 sets up the window modules 121 and the filter modules 122 of the signal processors corresponding to the first RB and the second RB respectively. The signal processor 12 corresponding to the first RB performs the windowing operation and the filtering operation on the signal to be transmitted via the first RB according to the window characteristic function and the filter characteristic function associated with the first RB, respectively. The signal processor 12 corresponding to the second RB performs the windowing operation and the filtering operation on signals to be transmitted via the second RB according to the window characteristic function and the filter characteristic function associated with the second RB, respectively.

Step S3' may include performing modulation on the data to be transmitted via the RBs to generate the modulated signals by the signal modulator 11 of the wireless communication apparatus 1. In this exemplary embodiment of the disclosure, the modulated signals may be OFDM symbols generated by OFDM technology.

After the signal processors 12 receive the modulated signals, step S4' may include performing the windowing operation on the modulated signals respectively by the window modules 121 of the signal processors 12 according to the window characteristic functions set in the window modules 121 to generate the window-operated signals. Then, step S5' may include performing the filtering operation on the window-operated signals respectively by the filter modules 122 of the signal processors 12 according to the filter characteristic functions respectively set in the filter modules 122 to generate the transmitting signals in time domain. The filter modules 122 send the transmitting signals to the transmitters 15, that is, the transmitting signals corresponding to the first to Kth RBs are generated, respectively. Take this exemplary embodiment of the disclosure adapted to two RBs as an example. Therefore, the signal processors 12 generate at least one transmitting signal corresponding to the first RB and the second RB. Here, the data to be transmitted via the first RB is taken as an example. After performing the windowing operation on the multi-carrier signal corresponding to the first RB according to the window characteristic function associated with the first RB by one of the window modules 121, one of the filter modules 122 further performs the filtering operation according to the filter characteristic function associated with the first RB to generate at least one transmitting signal supposed to be transmitted via the first RB. Then, in step S6', the transmitters 15 transmits the at least one transmitting signals.

Since each transmitting signal sources from one of the modulated signals on which one of the window modules 121 and one of the filter modules 122 perform the windowing operation and the filtering operation successively, each transmitting signal has the characteristic of low out-of-band emission, therefore, the inter-carrier interference is suppressed in a multi-user and multi-carrier communication system. In this exemplary embodiment of the disclosure, the filtering operation is performed after the windowing operation, therefore, the length of the filter characteristic function is relatively shorter than that of without the windowing operation pre-processed.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A wireless communication apparatus, transmitting at least one data by using a plurality of sub-carriers, the wireless communication apparatus comprising:
   a signal modulator, configured to generate at least one modulated signal in time domain based on the at least one data;
   a signal processor, coupled to the signal modulator, and configured to perform signal processing on the at least one modulated signal, wherein the signal processor comprises a window module and a filter module, wherein the window module performs windowing operation on the at least one modulated signal to generate a window-operated signal, and the filter module performs filtering operation on the window-operated signal to generate a transmitting signal in time domain;
   a storage, storing a plurality of program codes;
   a computing processor, coupled to the signal processor and the storage, and configured to access the program codes to perform operations of setting up the window module and the filter module respectively according to a window characteristic function and a filter characteristic function, and perform operations of performing an iterative out-of-band power leakage suppressing algorithm, wherein the iterative out-of-band power leakage suppressing algorithm is to estimate the window characteristic function and the filter characteristic function based on an out-of-band power spectral density function; and
   a transmitter, coupled to the signal processor and configured to transmit the transmitting signal.

2. The wireless communication apparatus of claim 1, wherein the computing processor is configured to receive a plurality of system parameters, and the out-of-band power spectral density function is based on the system parameters, wherein the system parameters comprise the filter characteristic function, a length of the filter characteristic function, the window characteristic function, a length of the window characteristic function, and a quantity of the sub-carriers.

3. The wireless communication apparatus of claim 1, wherein the storage further stores a plurality of candidate window characteristic functions and a plurality of candidate filter characteristic functions, and the computing processor accesses the program codes to perform operations of:
   setting up the window module and the filter module according to one or more condition parameters, the window characteristic function of the candidate window characteristic functions and the filter characteristic function of the candidate filter characteristic functions.

4. The wireless communication apparatus of claim 3, wherein the computing processor is configured to receive the one or more condition parameters and accesses the program codes to perform operations of:
   according to the one or more condition parameters, selecting the window characteristic function from the candidate window characteristic functions and selecting the filter characteristic function from the candidate filter characteristic functions, wherein the one or more condition parameters comprise at least one of out-of-band power leakage suppression level and signal-to-noise ratio loss.

5. A wireless communication apparatus, transmitting a plurality of data by using a plurality of sub-carriers, the wireless communication apparatus comprising:
   a signal modulator, configured to generate a plurality of modulated signals in time domain based on the data;
   a plurality of signal processors, coupled to the signal modulator, and configured to perform signal processing on the modulated signals, wherein each signal processor comprises:
   a window module, configured to perform windowing operation on one of the modulated signals to generate a window-operated signal, and
   a filter module, configured to perform filtering operation on the window-operated signal to generate a transmitting signal in time domain;
   a storage, configured to store a plurality of program codes;
   a computing processor, coupled to the signal processors and the storage, and configured to access the program codes to perform operations of setting up the window modules and the filter modules of the signal processors respectively according to a plurality of window characteristic functions and a plurality of filter characteristic functions; and
   at least one transmitter, coupled to the signal processors and configured to transmit the transmitting signals generated by the signal processors.

6. The wireless communication apparatus of claim 5, wherein the computing processor accesses the program codes to perform operations of performing an iterative out-of-band power leakage suppressing algorithm based on an out-of-band power spectral density function to estimate the window characteristic functions and the filter characteristic functions.

7. The wireless communication apparatus of claim 6, wherein the computing processor is configured to receive a plurality of system parameters, and the out-of-band power spectral density function is based on the system parameters, wherein the system parameters comprise the filter characteristic functions, a length of the filter characteristic functions, the window characteristic functions, a length of the window characteristic functions, and a quantity of the sub-carriers.

8. The wireless communication apparatus of claim 5, wherein the storage further stores a plurality of candidate window characteristic functions and a plurality of candidate filter characteristic functions, and the computing processor accesses the program codes further to perform operations of:
   setting up the window modules and the filter modules of the signal processors according to one or more condition parameters, the window characteristic functions of the candidate window characteristic functions, and the filter characteristic functions of the candidate filter characteristic functions.

9. The wireless communication apparatus of claim 8, wherein the computing processor is configured to receive the one or more condition parameters, and further accesses the program codes to perform operations of:
   selecting, according to the one or more condition parameters, the window characteristic functions from the candidate window characteristic functions, and the filter characteristic functions from the candidate filter characteristic functions, wherein the one or more condition parameters comprise at least one of out-of-band power suppression level and signal-to-noise ratio loss.

10. A method of generating wireless signals, applied to a wireless communication apparatus transmitting at least one data by using a plurality of sub-carriers, the method comprising:
    setting up a signal processor of the wireless communication apparatus according to a window characteristic function and a filter characteristic function;

generating at least one modulated signal in time domain based on the at least one data;

performing windowing operation on the at least one modulated signal to generate at least one window-operated signal, and performing filtering operation on the at least one window-operated signal to generate at least one transmitting signal in time domain, further comprising:

performing, based on an out-of-band power spectral density function, an iterative out-of-band power leakage suppressing algorithm to estimate the window characteristic function and the filter characteristic function; and transmitting the at least one transmitting signal.

11. The method of claim 10, wherein the out-of-band power spectral density function is based on a plurality of system parameters, wherein the system parameters comprise the filter characteristic function, a length of the filter characteristic function, the window characteristic function, a length of the window characteristic function, and a quantity of the sub-carriers.

12. The method of claim 10, wherein estimating the window characteristic function and the filter characteristic function by targeting at decreasing the function values of the out-of-band power spectral density function to a pre-defined level.

13. The method of claim 10, wherein the step of performing the iterative out-of-band power leakage suppressing algorithm to estimate the window characteristic function and the filter characteristic function comprises:

estimating an initial window characteristic function by targeting at decreasing the function values of the out-of-band power spectral density function;

updating the out-of-band power spectral density function based on the initial window characteristic function and estimating an Nth iterative filter characteristic function by targeting at decreasing the function values of the out-of-band power spectral density function, wherein N is a positive integer;

updating the out-of-band power spectral density function based on the Nth iterative filter characteristic function, and estimating an Nth iterative window characteristic function by targeting at decreasing the function values of the out-of-band power spectral density function;

updating the out-of-band power spectral density function based on the Nth iterative window characteristic function and, estimating an (N+1)th iterative filter characteristic function by targeting at decreasing the function values of the out-of-band power spectral density function;

updating the out-of-band power spectral density function by substituting the (N+1)th iterative filter characteristic function into the out-of-band power spectral density function and estimating an (N+1)th iterative window characteristic function by trimming down the value of the out-of-band power spectral density function; and calculating a mean square error between the (N+1)th iterative window characteristic function and the Nth iterative window characteristic function, and a mean square error between the (N+1)th iterative filter characteristic function and the Nth iterative filter characteristic function;

wherein when the mean square error between the (N+1)th iterative window characteristic function and the Nth iterative window characteristic function is not greater than a threshold value and the mean square error between the (N+1)th iterative filter characteristic function and the Nth iterative filter characteristic function is not greater than the threshold value, the (N+1)th iterative window characteristic function is determined to be the window characteristic function and the (N+1)th iterative filter characteristic function is determined to be the filter characteristic function;

wherein when the mean square error between the (N+1)th iterative window characteristic function and the Nth iterative window characteristic function is greater than the threshold value or the mean square error between the (N+1)th iterative filter characteristic function and the Nth iterative filter characteristic function is greater than the threshold value, the out-of-band power spectral density function is updated based on the (N+1)th iterative filter characteristic function, and an (N+2)th iterative window characteristic function is estimated by targeting at decreasing the function values of the out-of-band power spectral density function.

14. The method of claim 13, wherein the initial window characteristic function, the Nth iterative filter characteristic function, the Nth iterative window characteristic function, the (N+1)th iterative filter characteristic and the (N+1)th iterative window characteristic function are estimated by targeting at decreasing the function values of the out-of-band power spectral density function to a pre-defined level.

15. The method of claim 10, further comprising:

selecting, according to one or more condition parameters, the window characteristic function from a plurality of candidate window characteristic functions, and the filter characteristic function from a plurality of candidate filter characteristic functions.

16. The method of claim 15, wherein the one or more condition parameters comprise at least one of out-of-band power suppression level and signal-to-noise ratio loss.

* * * * *